United States Patent
Otterbach et al.

(10) Patent No.: US 6,803,673 B2
(45) Date of Patent: Oct. 12, 2004

(54) DEVICE FOR CONTROLLING FIRING CIRCUITS FOR RESTRAINING DEVICES

(75) Inventors: Jens Otterbach, Wenden (DE); Hartmut Schumacher, Freiberg (DE); Peter Taufer, Renningen (DE); Achim Henne, Sachsenheim (DE); Harald Tschentscher, Grossbottwar (DE); Michael Ulmer, Moessingen (DE); Andreas Rupp, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 09/990,232

(22) Filed: Nov. 21, 2001

(65) Prior Publication Data
US 2002/0167224 A1 Nov. 14, 2002

(30) Foreign Application Priority Data
Nov. 21, 2000 (DE) ......................................... 100 57 915

(51) Int. Cl.⁷ ................................................ B60L 1/00
(52) U.S. Cl. .......................... 307/9.1; 307/10.1; 701/45
(58) Field of Search ................................. 307/9.1, 10.1; 701/45

(56) References Cited
U.S. PATENT DOCUMENTS
5,899,949 A * 5/1999 Kincaid ...................... 701/45

FOREIGN PATENT DOCUMENTS

| DE | 42 37 404 | 5/1994 |
| DE | 196 60 290 | 4/1997 |
| DE | 196 46 387 | 5/1998 |
| DE | 197 43 914 | 11/1998 |
| DE | 198 13 953 | 7/1999 |
| DE | 199 18 634 | 11/2000 |
| EP | 842 824 | 5/1998 |

* cited by examiner

Primary Examiner—Robert DeBeradinis
(74) Attorney, Agent, or Firm—Kenyon & Kenyon

(57) ABSTRACT

A device for controlling firing circuits for restraining devices, a processor and a safety IC for controlling the restraining devices being connectable to the firing circuit control, and the firing circuit control having blocking inputs and blocking registers for the blocking of groups of connectable firing circuits; the processor setting the blocking registers after switching-on (of the device) and logically linking the firing circuit control data of the blocking inputs and the blocking registers with one another, so as to block individual groups of firing circuits. Thus it is especially possible individually to block firing circuits for air bags in dependence upon the degree of occupancy and the classification of the occupants in a vehicle. Setting the blocking inputs and the blocking registers takes place shortly after switching-on (of the device), after function tests of the IC's have been conducted. Besides the blocking inputs for individual control, the firing circuit control also has blocking inputs for blocking all plus and minus output stages.

8 Claims, 1 Drawing Sheet

DEVICE FOR CONTROLLING FIRING CIRCUITS FOR RESTRAINING DEVICES

FIELD OF THE INVENTION

The present invention is directed to a device for controlling ignition circuits for restraining devices.

BACKGROUND INFORMATION

Firing controls which are designed to work on integrated circuits (IC) are supplemented with additional external hardware for switching off individual igniter groups, such as the igniter dedicated to the front-seat passenger. An example of such additional hardware is MOSFET switches, which are then logically linked with one another.

SUMMARY OF THE INVENTION

The device according to the present invention for controlling firing circuits for restraining devices has the advantage that no additional external hardware is necessary; rather, the freely programmable blocking of groups of igniters is possible by the use of internal components of the firing circuit control.

It is especially advantageous that the processor can read out the blocking registers in order to conduct an error analysis of these components of the firing circuit control.

It is further of advantage that, after setting the blocking register, the processor blocks the blocking register to further changes during operation, so that a possibly defective processor has no influence by the arbitrary setting of the blocking register to the activation and blocking of the igniters, that is, the firing circuits.

In addition, it is of advantage that the processor checks the blocking inputs, the blocking register and the logical linkages when the device according to the present invention is switched on. This ensures that the group-wise blocking of igniters is properly carried out. The blocking inputs are checked by the processor via the safety (reliability) IC.

Lastly, it is also of advantage that the firing circuit control has blocking inputs for blocking the plus and minus output stages, so that, thus, all output stages can be blocked.

DETAILED DESCRIPTION

Because of the increasing number of air bags in motor vehicles, an intelligent blocking of some of these air bags is becoming necessary, depending on passenger classification and occupancy of the vehicle seats, in order to avoid injuries or unnecessary release of air bags.

According to the present invention, a device for controlling firing circuits for restraining devices is used which has blocking inputs and blocking registers for the blocking of groups of connectable firing circuits. By the logical combination of the blocking register and the blocking inputs it is possible to block individually assembled groups of firing circuits. A processor which controls the firing circuit control and is accommodated in a control unit for air bags has the means for reading out the blocking inputs and the blocking registers, in order thus to make an analysis. This is especially of advantage in the case of a faulty execution, in order to discover the reason for the error. A safety IC sets the blocking inputs and the processor fills the blocking registers directly after switching-on and the performance of the individual IC tests. After that, the processor blocks the blocking registers, to prevent a later change being made by such as a faulty processor. The firing circuit control, which is implemented on an integrated circuit, besides the blocking inputs which are provided for the blocking of individually assembled groups of firing circuits, also has blocking inputs for the plus and minus output stage, in order thus finally to be able to block all the output stages.

Figure 1:
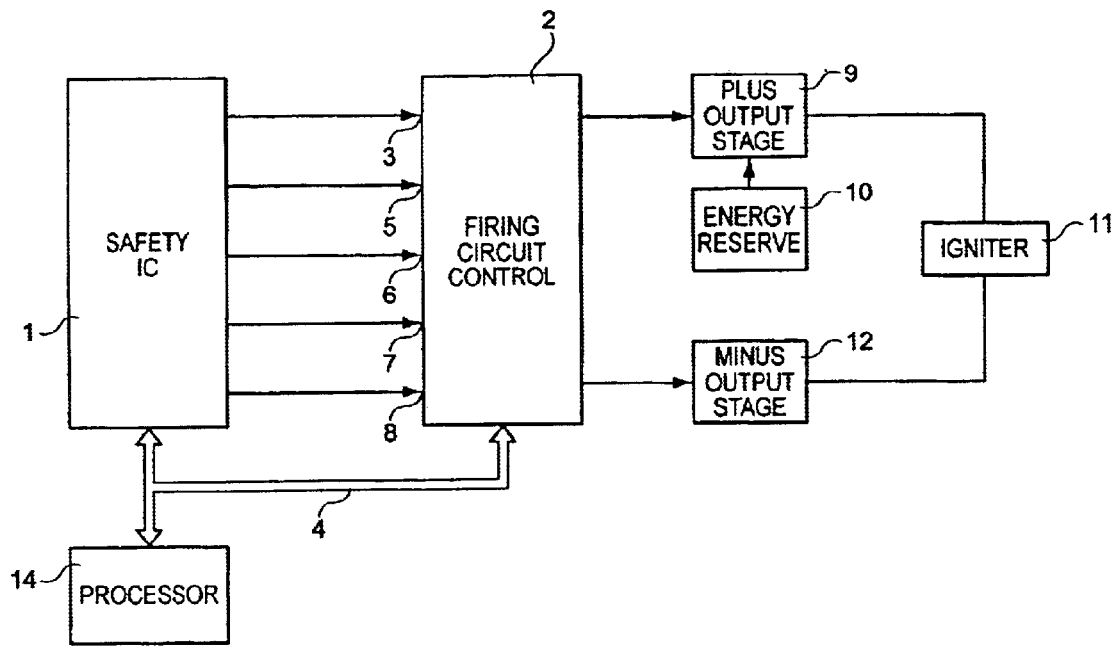
FIG. 1 shows a block diagram of the device according to the present invention.

FIG. 1 illustrates in block diagram the device according to the present invention for controlling firing circuits for restraining devices. A safety IC 1 is connected via a first data output to a blocking input for plus output stage 9 of a firing circuit control 2. Safety IC 1 is connected via its second, third and fourth data output to blocking inputs 5, 6 and 7, respectively, which are provided for individual blocking of different groups of firing circuits. The fifth data output connects safety IC 1 to the blocking input for the minus output stages. Data connection 4 connects safety IC 1, via its data input/output to a data input/output of a processor 14, as well as to a data input/output of firing circuit control 2. Plus output stage 9 is connected to an energy reserve 10 for voltage supply. Energy reserve 10 mainly has a capacitor for intermediate storage of electrical energy.

Firing circuit control 2 is connected to plus output stage 9 via a first data output. Firing circuit control 2 is connected to minus output stage 12 via a second data output. Plus output stage 9 and minus output stage 12 are connected to each other via an igniter 11. As an example, only one igniter 11 is shown here, and accordingly, also only one plus output stage 9 and one minus output stage 12, however, a plurality of firing circuits can be controlled by firing circuit control 2. In such a case, though, correspondingly more plus and minus output stages are available.

After the starting of the vehicle in which the device according to the present invention is installed, processor 14 executes IC tests on connected IC's. This also includes firing circuit control 2. Tests are carried out via data connection 4, in order to verify the functionality of firing circuit control 2. After that, safety IC 1 receives data concerning occupancy of the vehicle seats from various sensors. These sensor data are also registered by processor 14. The data make a distinction as to whether adults or children or objects are on the individual vehicle seats. In particular, it is investigated here whether there is a children's seat on the vehicle seat. In the case of children, vehicle seats and objects, or unoccupied vehicle seats, no restraining device, that is, no air bag is to be released during a crash, in order to avoid injuries and unnecessary activation of the restraining devices. In that case the corresponding firing circuits are to be blocked. Depending on these data, safety IC 1 will now cause a corresponding blocking via firing circuit control 2. For this purpose, safety IC 1 sets blocking inputs 5, 6 and 7, so as to block the corresponding igniter groups. Safety IC 1 guarantees that the sensor data are investigated for plausibility independently of processor 14, so that, with great probability, false triggering of the restraining devices does not take place. Safety IC 1 has its own hardware for this, which makes possible checking the sensor data for the criteria firing-relevant or not firing-relevant. In this connection especially a threshold value comparison is made, while processor 14 calculates through a complete firing algorithm for evaluation of the sensor data.

Figure 2:
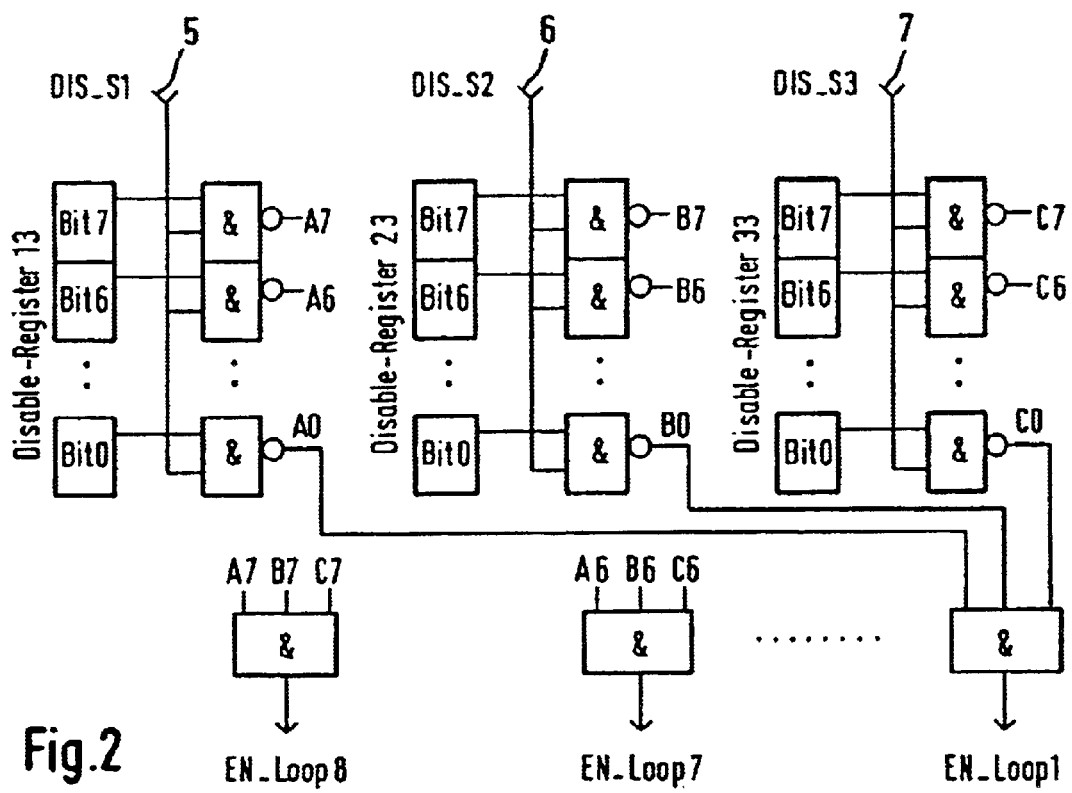
FIG. 2 shows a circuit of the blocking registers and the blocking inputs.

FIG. 2 shows how blocking inputs 5, 6 and 7 are logically combined with blocking registers 13, 23 and 33, here called disable registers, in order to block corresponding groups of firing circuits. Blocking registers 13, 23 and 33 have a width of 8 bits, and each bit is connected to the input of a NAND gate. The second input of the NAND gates is occupied in each case by a blocking input. The linkage results are then available at the outputs of the NAND gates. These linkage results are here designated as A7 to A0 for disable register 13, B7 to B0 for second disable register 23, and C7 to C0 for third disable register 33. The output signals of the NAND gates of the corresponding bits are then linked with one another with an AND gate. That means, then, that A0, B0 and C0 are linked together in an AND gate and give the result for a plus output stage, that is, whether blocking is present or whether it is not. Correspondingly, output signals A6, B6 and C6 form the inputs of an AND gate and outputs A7, B7 and C7 are also connected to the inputs of an AND gate. A logical 1 in a disable register bit has the effect that the output of the connected NAND gate reproduces the inverted logic state of a blocking input 5, 6 or 7. Thus, the NAND gate becomes transparent to the respective blocking input. The outputs of the NAND gates, as represented above, are routed to 8 AND gates. Their outputs EN_loop1 through EN_loop8 go to the appertaining control circuits of the plus output stages, and lead to a corresponding blocking.

The firing circuits are each fed via plus output stages, so that blocking can occur in a simple way via the plus output stages. This makes it clear that each of blocking inputs 5, 6 and 7 can block an individually configurable group of up to 8 firing circuits. A logical 0 in a disable register bit has the effect that the output of the connected NAND gate is always a logical 1, independently of the state of the blocking input.

What is claimed is:

1. A device for controlling firing circuits for restraining devices in a motor vehicle, comprising:

at least one igniter;

output stages;

a firing circuit control for connection to the at least one igniter and the output stages;

a processor connected to the firing circuit control for controlling the restraining devices, the processor releasing the output stages in response to a crash of the motor vehicle; and a safety IC connected to the firing circuit control for releasing the at least one igniter in response to a crash, the safety IC recognizing a crash;

wherein the firing circuit control has blocking inputs and blocking registers for blocking groups of connectable firing circuits which have the output stages and the at least one igniter;

wherein, subsequent to the device being switched on, the processor sets the blocking registers and the safety IC connects the blocking inputs as a function of an occupancy of seats of the motor vehicle; and wherein the firing circuit control logically links data of the blocking inputs and of the blocking registers to one another, in order to block individual groups of firing circuits.

2. The device according to claim 1, wherein the processor is adapted to read the blocking inputs and the blocking registers.

3. The device according to claim 1, wherein the processor blocks the blocking registers after they have been set.

4. The device according to claim 1, further comprising means for checking the blocking registers, the blocking inputs and a logical linking by the processor after the device is switched on.

5. The device according to claim 1, wherein the output stages include plus and minus output stages, and wherein the firing circuit control has a blocking input for each of the plus and minus output stages.

6. The device according to claim 1, wherein at least one of the safety IC and the processor performs a plausibility check on the sensor data.

7. The device according to claim 1, wherein the safety IC analyzes the sensor data using a threshold value comparison.

8. The device according to claim 1, wherein the processor analyzes the sensor data using a firing algorithm.

* * * * *